United States Patent [19]

Argyris et al.

[11] 4,015,817
[45] Apr. 5, 1977

[54] STOP MEANS FOR VALVES

[75] Inventors: Pericles Alexandre Argyris, Houston, Tex.; William Randolph Williams, Morgantown, W. Va.

[73] Assignee: Rockwell International Corporation, Pittsburgh, Pa.

[22] Filed: Feb. 18, 1975

[21] Appl. No.: 550,290

[52] U.S. Cl. .............................. 251/288; 137/375
[51] Int. Cl.² .................... F16K 3/00; F16K 51/00
[58] Field of Search .......... 137/375; 251/286, 287, 251/288

[56] References Cited

UNITED STATES PATENTS

| | | | |
|---|---|---|---|
| 849,724 | 4/1907 | Christ | 251/287 |
| 1,221,093 | 4/1917 | Rogers | 137/375 |
| 3,358,714 | 12/1967 | Moen | 137/625.17 |
| 3,674,048 | 7/1972 | Manoogian et al. | 251/288 X |
| 3,788,601 | 1/1974 | Schmitt | 251/288 X |
| 3,814,120 | 6/1974 | Moen | 251/288 X |

Primary Examiner—Alan Cohan
Assistant Examiner—Gerald A. Michalsky

[57] ABSTRACT

A stop member adapted to be mounted on the body of a valve has abutment stops to define the open and closed position of the valve and a portion which acts as a retainer to retain the closure member of the valve against vertical movement. The stop member has a surface which acts as a guide and support for the handle. Mounting means are provided on the body of the valve and on the stop member which are formed in such a manner to insure that the stop member will be mounted on the valve body in only one position of orientation between the abutment stops and the inlet and outlet ports of the valve.

10 Claims, 9 Drawing Figures

STOP MEANS FOR VALVES

BACKGROUND AND DESCRIPTION OF THE PRIOR ART

The present invention relates to stop means for rotary valves, particularly household water valves of the type used in kitchen and bathroom sinks which performs a multiplicity of functions; namely, provides means to retain the rotary member against axial movement, provides rotary stops to define the open and closed position of the valve and provides a bearing surface to guide the operating handle in its rotary movement. The prior art as exemplified by Moen U.S. Pat. No. 3,204,656 and 3,358,714 utilizes clip members or keys insertable into a stationary member to retain a valve assembly against vertical movement. In the former patent, the clip member 10 is utilized solely to retain the valve assembly against vertical movement. The latter patent however shows a key 78 inserted into a stationary member which serves to limit axial movement of a valve assembly and has an extension 80 which provides a rotary stop which cooperates with abutments on the operating handle of the valve to limit rotation of the handle. It should be noted however that in neither case does the valve closure member employ a rotary motion to move between valve open and valve closed position. Also, in both cases it is possible to insert the retainer/abutment member from either of two opposite directions. If the key 78 of the latter patent were inserted from the opposite direction than that shown either the stop means 80 would be 180° out of position, or the stop means together with all of the other rotatable members would be 180° out of position with respect to the inlet and outlet ports. Moreover in neither of these prior art patents do the stop members perform the additional function of providing a bearing surface to support and guide the operating knob during its rotary motion. The stop member of the present invention supplies these omissions thus providing relatively simple and inexpensive stop means in this art where every possible economy must be practiced if the structure is to be economically and functionally successful on the market.

SUMMARY AND OBJECTS OF THE INVENTION

Accordingly it is an object of the present invention to provide a stop member which functions to provide a rotary stop position for the rotary closure member as well as to retain the closure member against vertical movement. It is a further object of the invention to provide a stop member for a water valve which is less complex and more economical to produce compared to the prior art. It is a further object of the present invention to provide a stop member which provides rotary and axial stop means for the valve closure member, incorporates means to insure that the stop member cannot become misoriented with respect to the valve open and closed positions of the closure member in assembly, and additionally provides means to laterally support and guide the operating knob. Further objects of this invention will appear as the description proceeds.

DESCRIPTION OF THE DRAWINGS

FIG. 5b is a top plan view of the housing element of FIG. 5a.

FIG. 6b is a cross-sectional view taken along the lines 6b—6b of FIG. 6a.

FIG. 6c is a bottom plan view of the stop member shown in FIG. 6a.

DESCRIPTION OF PREFERRED EMBODIMENT

Figure 4:
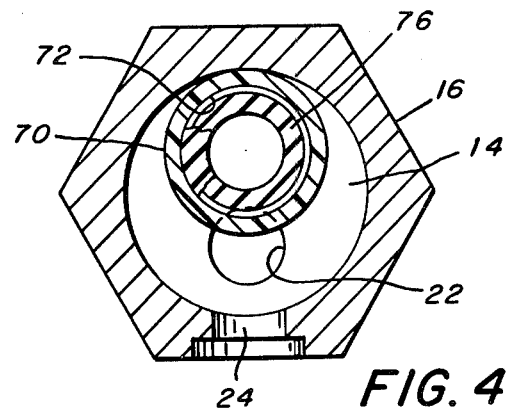
FIG. 4 is a sectional view taken along the lines 4—4 of FIG. 2, but with the closure member rotated 180° from the position of FIG. 1.
Figure 5B:
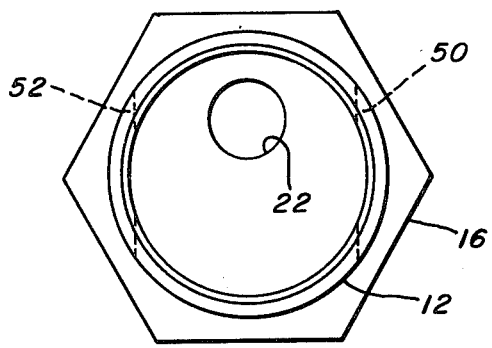

Referring in particular to FIGS. 1, 2, 5a and 5b of the drawings a valve housing 10 has a generally cylindrical wall 12 which encloses a chamber 14. The exterior of the lower portion 16 of the wall 12 is formed in the shape of a nut having flats as best shown in FIGS. 4 and 5b. An inlet passage 18 generally coaxial with the axis of chamber 14 is separated from chamber 14 by a wall 20 in which is formed inlet port 22 which is off set from or eccentric to the axis of chamber 14. Outlet port 24 is formed in wall portion 16. Thus both inlet port 22 and outlet port 24 communicate with chamber 14. A tube 26 may be soldered or otherwise suitably fixed to the exterior of wall portion 16 in surrounding relationship to outlet port 24 to carry the water to the spout (not shown) when the valve is in the open position. The lower portion of the exterior of housing 10 is threaded as shown by numeral 17 to receive a nut for clampingly seating the valve on a sink top between the nut and portion 16. A closure member generally indicated by the numeral 30 is comprised of a central cylindrical portion 31, a shank portion 32, rim portions 33 and 34, and a seal receiving portion 70, is mounted in chamber 14 for rotation about the axis of chamber 14 and wall 12. The rim portion 34 is sealed with respect to wall 12 by means of a sealing element 35 located in a groove in the periphery of rim portion 34 which element sealingly engages the interior of wall 12 to prevent the escape of fluid from the chamber 14 past the rim portion 34.

Figure 1:
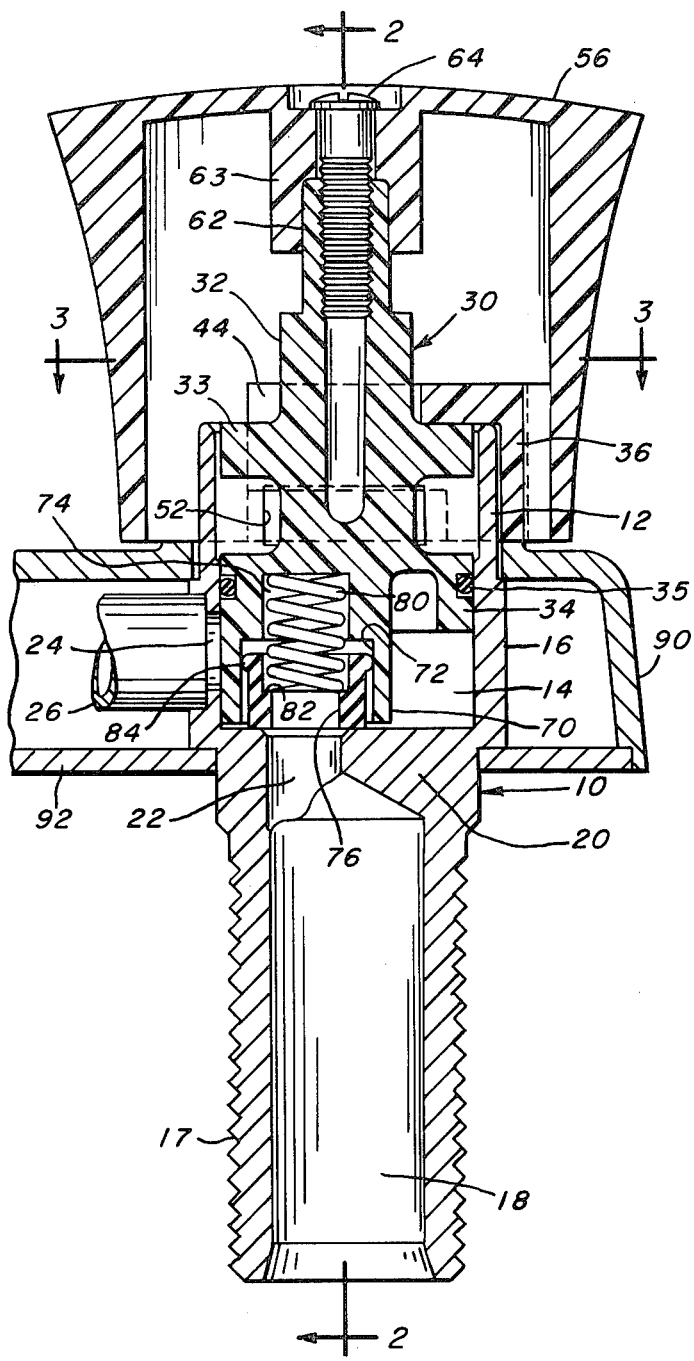
FIG. 1 is an elevational view in section of a lavatory valve embodying the invention.
Figure 2:
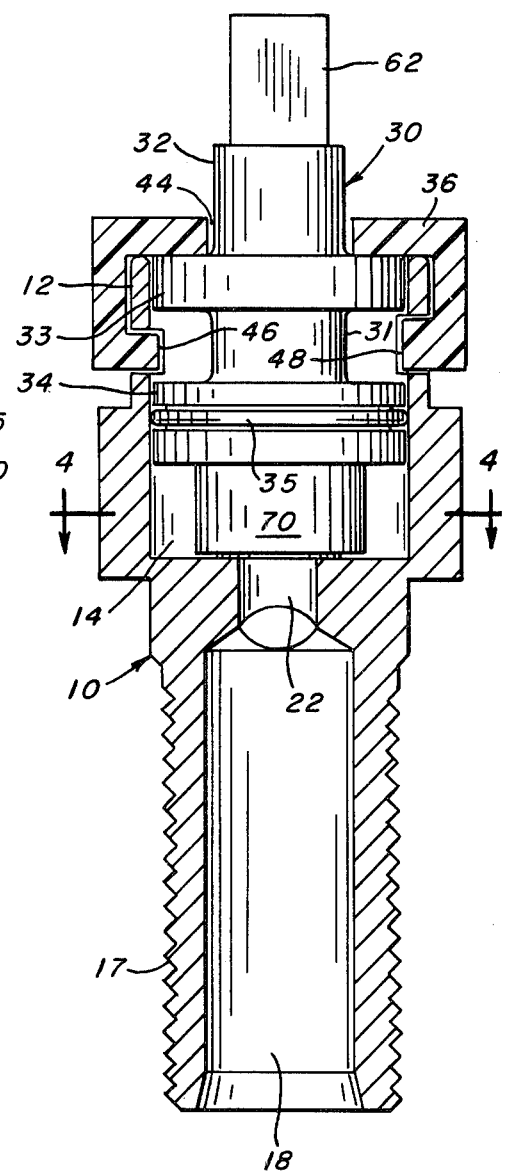
FIG. 2 is an elevational view in section of the valve of FIG. 1 along the lines 2—2 of FIG. 1. In this view the rotatable closure element is not in section, and the operating knob has been removed.

Referring to FIGS. 1 and 2, formed on the lower portion of closure member 30 beneath rim 34 is a cylindrical seal receiving portion 70 in which is formed a cylindrical recess 72 and blind counterbore 74. Recess 72 and counterbore 74 are coaxial with each other and are coaxial with the axis of seal receiving portion 70 the axis of which is eccentric to the axis of rotation of closure member 30. A cylindrical sealing element 76 made of a suitable elastomeric material such as rubber or neoprene is snugly but slidably received in recess 72. An annular bead 84 is formed around the upper exterior surface of element 76 which is of such a dimension to insure a slightly compressive engagement between the bead and the wall of recess 72. The interior surface of the sealing member 76 is provided with an annular shoulder 82. When assembled, a spring 80 is compressed between the end wall of counterbore 74 and the shoulder 82 on sealing member 76 to urge the sealing member into sealing engagement with the upper surface of wall 20 of housing 10.

At the same time the closure member is urged upwardly against stop member 36. In the assembly there is normally a slight clearance between the bottom of seal receiving portion 70 and the upper surface of wall 20 and while some slight vertical movement of the closure member is possible within the limits of this clearance the stop member 36 functions to retain the closure member against any further vertical displacement in an upward direction.

Figure 6A:
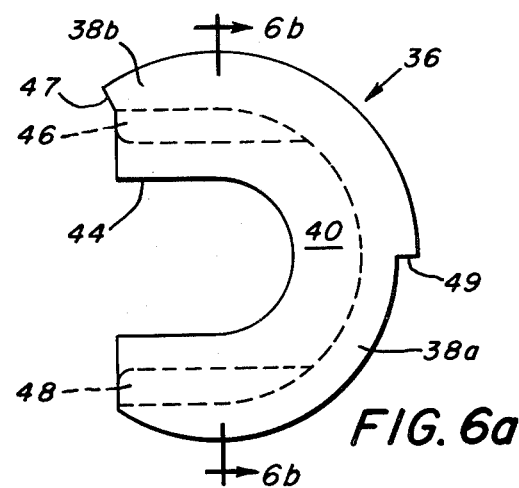
FIG. 6a is a top plan view of the stop member utilized in the valve of the present invention.
Figure 6B:
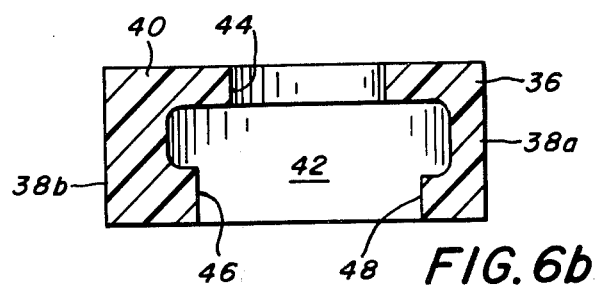
Figure 6C:
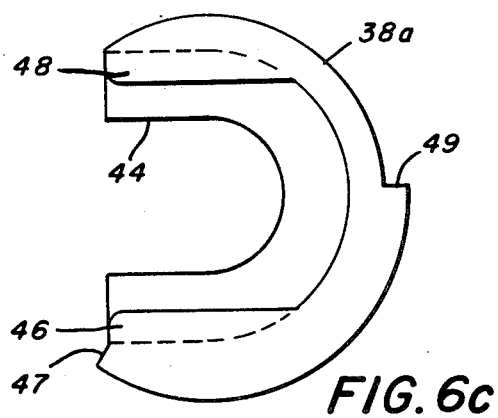

Stop member 36 shown in detail in FIGS. 6a, 6b and 6c is generally C-shaped when viewed in plan from above as shown in FIG. 6a. A circumferential side wall made up of a relatively thin portion 38a and a relatively thick portion 38b extends around the entire periphery of stop member 36 and cooperates with top wall 40 to form an interior recess 42 (FIG. 6b). A slot 44 is formed in top wall 40 the right end of which when viewed as in FIG. 6a is open and the left end of which is semi-circular. Ribs 46 and 48 are respectively formed on the interior of wall portions 38b and 38a on opposite sides of recess 42. Ribs 46 and 48 merge respectively with the interiors of the curved portions of walls 38b and 38a as shown in FIGS. 6a and 6c. It should be noted that the vertical dimension of rib 46 as viewed in FIG. 6b is greater than the vertical dimension of rib 48 for a purpose which will hereinafter appear. Wall portion 38b has an abutment surface 47 at one end and an abutment surface 49 formed where wall portion 38b merges with wall portion 38a.

Figure 5A:
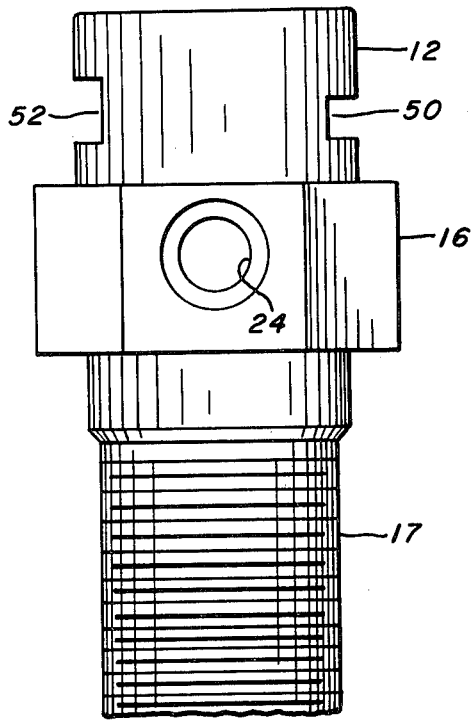
FIG. 5a is an elevational view of the housing element viewed from the left in FIG. 1.

As best shown in FIGS. 5a and 5b, segmental openings or slots 50 and 52 are cut into the wall 12 of housing 10. As viewed in FIGS. 5a slot 50 is of a vertical dimension which corresponds to the vertical dimension of rib 48 and slot 52 is of a vertical dimension which corresponds to the vertical dimension of rib 46 of stop member 36. In assembly, stop member 36 is mounted on the housing 10 from the right as viewed in FIG. 1 so that rib 46 is received into slot 52 and rib 48 is received into slot 50 to slidably mount stop member 36 over the top of wall portion 12 of housing 10. So mounted, as shown in FIGS. 1 and 2, shank portion 32 of closure member 30 protrudes through slot 44 in top wall 40 of stop member 36. In this position the lower surface of wall 40 abuts against the upper surface of rim portion 33 of the closure member to retain the closure member 30 against vertical movement while permitting rotation thereof in the assembly. It will be noted that because the ribs 46 and 48 must mate respectively with slots 52 and 50 the stop member can only be mounted on housing 10 from one direction, that is from the right as viewed in FIG. 1. By this arrangement of elements the proper location with respect to inlet 22 and outlet 24 of abutments 47 and 49 on stop member 36 is insured for cooperation with stop abutment surfaces on the knob or handle 56 as hereinafter described.

Figure 3:
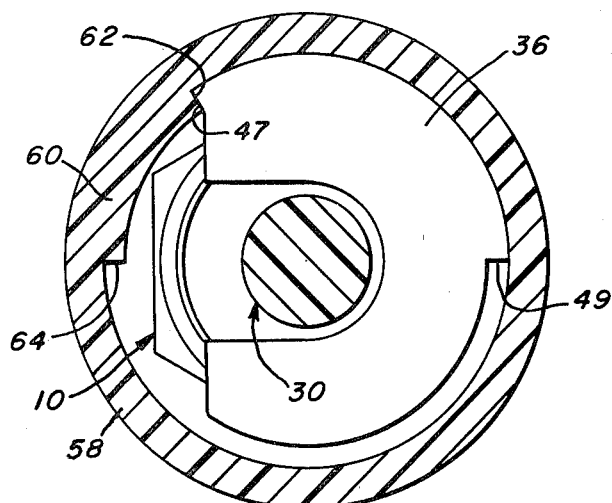
FIG. 3 is a view taken along lines 3—3 of FIG. 1.

As best shown in FIG. 3 wall 58 of knob or handle 56 is provided with a thickened portion 60 which at either end forms with the interior of wall 58 the abutment surfaces 62 and 64. The closed position of the valve is defined when abutment surface 62 on knob 56 abuts against abutment surface 47 on stop member 36. The full open position of the valve closure member is defined when the abutment surface 64 abuts up against abutment surface 49 on stop member 36. Portion 32 (FIG. 1) of closure member 30 is provided with flat sides 62 which are received in a complementary flat-sided socket formed in boss 63 provided on the interior of handle 56. The handle is further secured on the closure member 30 by means of a screw 64.

As can be seen from FIG. 3 the exterior of wall portion 38b which extends between abutments 47 and 49 and is in contact with and slidably engages the interior surface of knob 56. Thus, the knob is supported against lateral thrusts and as the knob is turned from one position to the other it is guided by, and in effect, journalled on the exterior surface of wall portion 38b which extends between the abutments 47 and 49. Thus, in addition to the functions described above the stop member also serves as a guide for the rotary movement of the knob and a support which is capable of absorbing lateral thrusts on the knob.

While the embodiment described above utilizes a difference in size in slots 52 and 50 and ribs 46 and 48 to insure proper orientation, other characteristics could also be employed to achieve the same result. For example, the slots 52 and 50 could be formed with different configurations with ribs 46 and 48 having matching configurations. The essential requirement is that slots 52 and 50 be different from each other in some respect and that the ribs 46 and 48 have respectively the same characteristic as slots 52 and 50.

In the faucet assembly a cover member 90 and base plate 92 enclose a part of the housing 12 and outlet tube 26 as shown in FIG. 1. The base plate 92 mounts on the sink top (not shown), the sink and base plate 92 having suitable openings through which the threaded portion 17 of the housing 12 projects. The cover 90 similarly has an opening through which projects that portion of the housing 12 on which the stop member 36 is mounted. When the faucet assembly is assembled as shown in FIG. 1 the bottom of the stop member 36 bears against the top of the cover 90 and serves to hold the cover and base plate in place in the assembly. The portion of housing 12 which projects through the cover 90 is covered by the knob 56 so that the operating parts of the valve, including the valve housing 12 and the outlet tube 26 are enclosed within the cover 90 or knob 56.

Thus it will be seen that the stop member 36 hereinabove described performs the multiple functions of retaining the cover member 90 and closure member 30 against vertical displacement, provides abutment stop members for cooperation with abutment stops on the handle to define the open and closed position of the valve and provides a guide for the rotary movement of the knob which is also capable of absorbing lateral thrusts. Since stop member 36 can be mounted on the body in only one position with respect to the position of inlet 22 and outlet 24, any possible misorientation of abutment surfaces 47 and 49 with respect to the inlet and outlet ports during the assembly process is prevented.

In the closed position of the valve the closure member 30 is in the position shown in FIG. 1. In that position the spring 80 urges the sealing element 76 into sealing engagement with the upper surface of wall 20 around the inlet 22 as can be seen from FIG. 1. In this position the interior of the cylindrical sealing element 76 and the upper edge thereof is exposed to the upstream pressure from inlet passage 18. This upstream pressure is initially prevented from escape between the exterior surface of the sealing element 76 and the surface of the recess 72 by the engagement of bead 84 with the interior surface of recess 72. This upstream pressure works against the upper annular end surface of the sealing element 76 to urge it downwardly and into leak tight engagement with the upper surface of wall 20. At the same time the fluid pressure within sealing element 76 urges the resilient wall of the sealing element into tight engagement with the wall of recess 72 to augment the sealing engagement therebetween. Thus in the closed position the pressure of the spring 80 is augmented by the upstream pressure to provide a pressure actuated leak tight seal between the closure member 30 and inlet 22.

To open the valve the knob 56 and the closure element 30 are rotated in a counterclockwise direction as viewed in FIG. 3 until abutment surface 64 on knob 56 engages abutment surface 49 on stop member 36. In this position the cylindrical seal receiving portion 70 of closure member 30 will be moved to the position shown in FIG. 4 where the inlet 22 is uncovered and the fluid then passes from inlet 22 through chamber 14 and out outlet 24. It will be noted that in the open position of the closure element as shown in FIG. 4 the seal element 76 is essentially removed from the fluid stream and is further protected from the eroding effect of the flow of fluid by the wall of seal receiving portion 70 of closure member 30. In the valve arrangement hereinabove described the fluid flow rate capacity is limited only by the size of inlet 22 and outlet 24, since the chamber 44 is relatively large with respect to the size of inlet 22, outlet 24 and the seal receiving portion 70, so that the seal receiving portion does not have any significant inhibiting effect on the flow capacity of the valve.

The invention hereinabove described provides a stop which performs a multiplicity of functions, is easily assembled into a valve having a minimum number of parts, to produce a very economical valve in an art where even small economies may be the difference between market success or failure.

We claim:

1. A valve assembly comprising a housing, a cylindrical chamber within said housing and inlet and outlet ports in said housing communicating with said chamber, a closure member within said chamber rotatable between a valve open and a valve closed position, a stop member mounted on said housing, stop means on said stop member defining a valve open and a valve closed position, cooperating means on said housing and said stop member to insure a predetermined orientation of said stop means with respect to said inlet and outlet ports comprised of at least two spaced openings on said housing each of a different configuration from the other and at least two spaced portions on said stop member each of which has a configuration to match respectively the configuration of one of said openings on said housing.

2. A valve assembly comprising a housing, a cylindrical chamber within said housing and inlet and outlet ports in said housing communicating with said chamber, a closure member within said chamber rotatable between a valve open and a valve closed position, a stop member mounted on said housing, stop means on said stop member defining a valve open and a valve closed position, cooperating means on said housing and said stop member to insure a predetermined orientation of said stop means with respect to said inlet and outlet ports comprised of at least two spaced openings on said housing each of which is a different size from the other and at least two spaced portions on said stop member each of a size corresponding respectively to the size of one of said openings on said housing.

3. A water valve assembly comprising a hollow housing, inlet and outlet ports in said housing, a closure member rotatably mounted in said housing adapted to rotate between a closed position in which position fluid communication between said ports is prevented and a valve open position in which position fluid communication between said ports is established, a stop member mounted on said housing having a portion in contact with said rotatable closure member to retain said closure member against axial movement while permitting rotation thereof between a valve open and valve closed position, a pair of stop means on said stop member angularly spaced from each other with respect to the axis of rotation of said closure member and corresponding respectively to a valve open and valve closed position of said closure member, a valve operating member secured to said closure member in cooperative relationship to said stop member, stop abutment means on said valve operating member adapted to abut against one of said stop means on said stop member to define a valve open position and against the other of said means on said stop member to define a valve closed position, orientation means on said stop member and said housing to insure a predetermined orientation of said stop means with respect to said inlet and outlet ports when said stop member is mounted on said housing comprised of at least a pair of receptacle means in said housing each of a different size from the other and at least a pair mating portions on said stop member the size of each corresponding respectively to the size of one of said receptacle means.

4. For use in a valve assembly comprising a housing and a rotatable closure member received therein, said housing having inlet and outlet ports formed therein, a stop member comprising stop means to define a valve open and a valve closed position of said closure member, means on said stop member to cooperate with means on said housing for mounting said stop member on said housing in a predetermined orientation with respect to said inlet and outlet ports, a top wall on said stop member of generally circular configuration and an opening through said top wall through which a portion of said closure member projects when said stop member is mounted on said housing, said opening extending to the periphery of said top wall to provide a slot for the passage of said portion of said closure member to permit said stop member to be mounted on said housing from a direction perpendicular to the axis of rotation of said closure member, a circumferential wall depending from the periphery of said top wall and generally coextensive therewith, said mounting means on said stop member comprising rib portions formed on the interior of said circumferential wall.

5. The stop member of claim 4 in which said rib portions are each of a different size and each corresponds respectively to the size of an opening in said housing.

6. For use in a valve assembly comprising a housing and a rotatable closure member received therein, said housing having inlet and outlet ports formed therein and receptacle means thereon comprising at least two spaced openings in said housing each opening having a different characteristic from the other, a stop member comprised of a top wall of a generally circular configuration adapted to abut against a portion of said closure member to retain said closure member against vertical movement when said stop member is mounted on said housing, a circumferential wall depending from the periphery said top wall and generally co-extensive therewith, abutment stops on said stop member to define the open and closed position of said closure member, at least two rib portions on the interior of said circumferential wall adapted to be received in said openings in said housing, one of said rib portions having a characteristic corresponding to the characteristic of one of said openings, the other of said rib portions having a characteristic corresponding to the characteristic of said other opening whereby said stop member may be mounted on said housing in only one position of orientation between said abutment stops and said inlet and outlet ports.

7. The stop member of claim 6 in which the size of each of said rib portions is different and corresponds to the size of a respective one of said openings in said housing.

8. The stop member of claim 6 in which the configuration of each of said rib portions is different from the other and each corresponds to the configuration of a respective one of said openings.

9. The stop member of claim 6 in which said top wall has an opening therethrough through which a portion of said closure member projects when said stop member is mounted on said housing, said opening extending to the periphery of said top wall to provide a slot for the passage of said portion of said closure member to permit said stop member to be mounted on said housing from a direction perpendicular to the axis of rotation of said closure member.

10. For use in a valve assembly comprising a housing and a rotatable closure member received therein, said housing having inlet and outlet ports formed therein, a stop member comprising stop means to define a valve open and a valve closed position of said closure member, means on said stop member to cooperate with means on said housing for mounting said stop member on said housing in a predetermined orientation with respect to said inlet and outlet ports, said means comprising at least two rib portions each of a different size adapted to be received in an opening of a corresponding size in said housing.

* * * * *